May 5, 1931.　　　T. M. FINLEY　　　1,803,795

SLIDE TRANSMISSION FOR INTERNAL COMBUSTION ENGINES

Filed July 9, 1926　　2 Sheets-Sheet 2

Inventor
T. M. Finley,
By Harry F. Riley
Attorney

Patented May 5, 1931

1,803,795

UNITED STATES PATENT OFFICE

THOMAS M. FINLEY, OF ST. LOUIS, MISSOURI

SLIDE TRANSMISSION FOR INTERNAL COMBUSTION ENGINES

Application filed July 9, 1926. Serial No. 121,441.

The invention relates to a slide transmission for internal combustion engines.

The object of the present invention is to provide for internal combustion engines for use on aeroplanes, airships, automobiles and the like, a simple, practical and efficient slide transmission device of strong, durable and comparatively inexpensive construction adapted to do away with all connecting rods for connecting the pistons of an engine with a crank shaft and also the bearings thereof and at the same time enable a plurality of rows of cylinders to be connected with and transmit their power to a single crank shaft.

A further object of the invention is to improve the construction of internal combustion engines and eliminate vibration and reduce the weight of the engine and at the same time enable heavier and better material to be employed in the construction of airships, aeroplanes, automobiles and various other types of internal combustion engine motors.

It is also an object of the invention to reduce the size of such engines and the fuel and oil consumption of the same and increase the endurance and life thereof.

It is also an object of the invention to provide a slide transmission in which the movement will be vertical or longitudinally of the engine in the direction of the delivery of the force of the explosion thereby eliminating side thrust and resulting in a much smoother running motor as well as more quiet operation. The slide transmission by affording the straight vertical movement eliminates side swing and lateral thrust in a motor and better fits the same for use in automobiles and other motor vehicles.

Another object of the invention is to provide a slide transmission device in which the beneficial effects and advantages will increase with the increase in the number of cylinders of a motor and enable any desired number of cylinders to be advantageously employed in motor construction.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1:
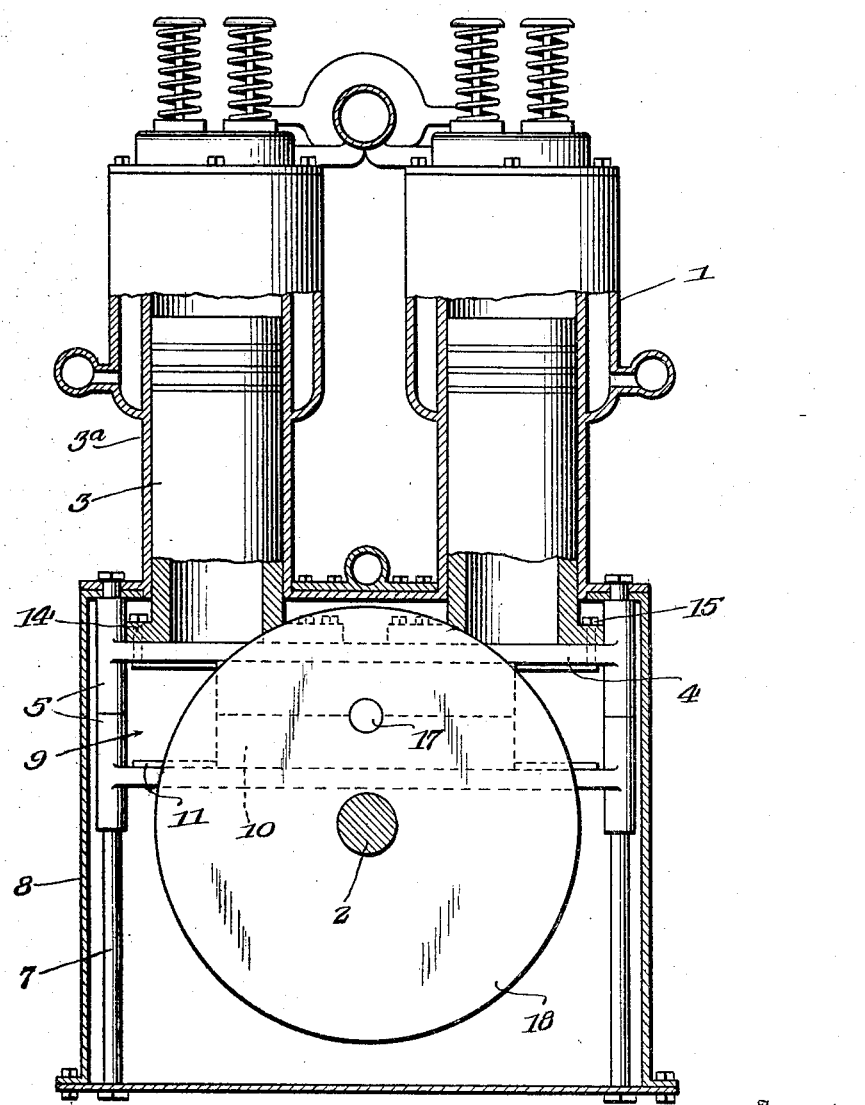
Figure 1 is a vertical transverse sectional view of a motor provided with a slide transmission constructed in accordance with the present invention.
Figure 2:
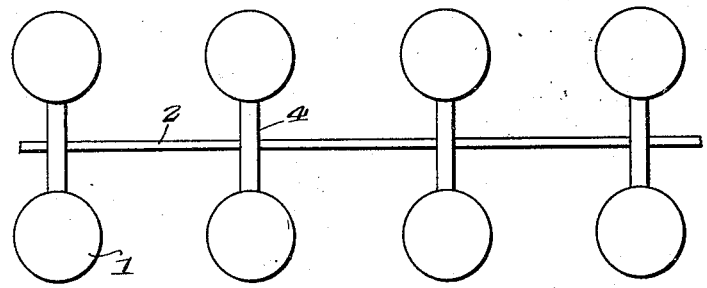
Fig. 2 is a diagrammatic view of an eight cylinder motor illustrating the arrangement of the slide transmission devices and the single crank shaft.
Figure 3:
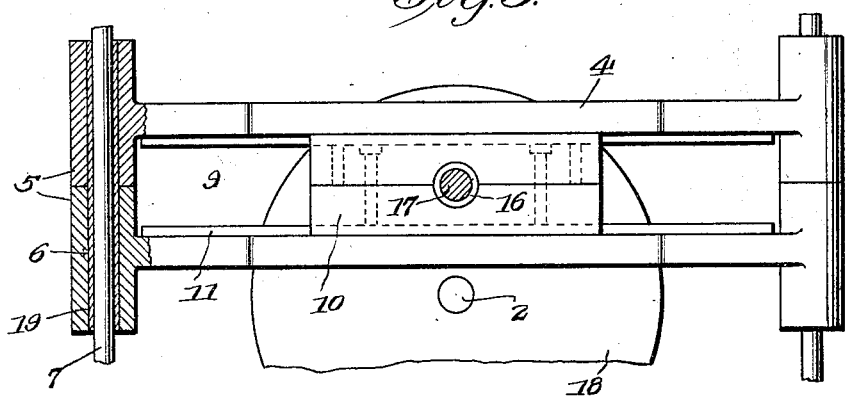
Fig. 3 is a vertical sectional view taken longitudinally of the slide transmission.
Figure 5:
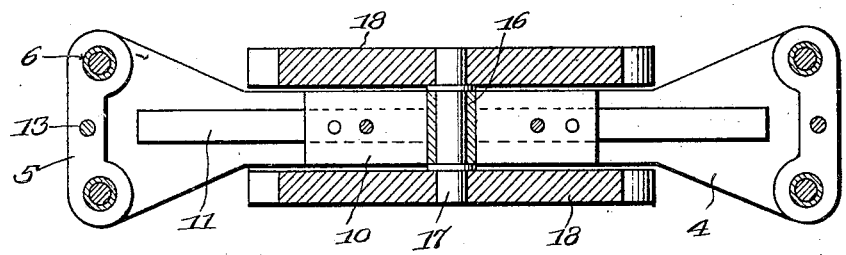
Fig. 5 is a horizontal sectional view of the slide transmission device.
Figure 4:
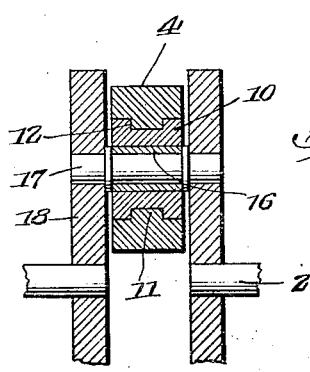
Fig. 4 is a central vertical sectional view of the transmission device taken at right angles to Fig. 3.

In the accompanying drawings in which is illustrated the preferred embodiment of the invention, the slide transmission device is illustrated as applied to an internal combustion engine having eight cylinders 1 arranged in two rows of four cylinders to a row, but any number of cylinders may of course, be employed by varying the number of rows and the number of cylinders in each row and the single crank shaft 2 is employed with each arrangement of the cylinders. While the number of cylinders may be varied only one crank shaft is necessary. Each pair of cylinders is connected with the crank shaft 2 by a slide transmission device which is adapted for connecting a plurality of pistons 3 or cylinders 3ᵃ with the crank shaft and when a motor is provided with three rows of cylinders, the slide transmission will be connected with the pistons of three cylinders and it will be connected with pistons of four cylinders when four rows of cylinders are employed. As each slide transmission device is the same, detail description and illustration of one transmission device only is deemed necessary.

The slide transmission device comprises a vertically slidable horizontally disposed cross head 4 to which the pistons 3 of the cylinders 1 are rigidly secured. The cross head 4 is preferably composed of upper and lower sections provided at the ends with transverse lugs or flanges 5 which are fitted together and which are provided with vertical openings 6 to receive fixed guide rods 7 arranged in pairs and rigidly connected with the cylinders. The cylinders may be arranged in the single block or be constructed in any other manner as will be readily understood and the vertical guide rods 7 are shown in the accompanying drawings as arranged within a frame 8 which is secured to and rigid with the engine cylinders but the guide rods may be connected with the engine frame or mounted in any other desired manner as will be readily understood. The end flanges or portions 5 space the intermediate portions of the sections of the cross head and provide an oblong space or opening 9 for the reception of a transverse slide 10 which reciprocates horizontally simultaneously with the vertical sliding movement of the cross head 4. The cross head is provided at the inner faces of the sections with longitudinal guide ribs 11 which are located at the top and bottom of the opening 9 and which fit in grooves 12 of the slide. The sections of the cross head are bolted together at 13 through the end flanges or portions and provide a solid cross head structure but the particular construction of the cross head may be varied as will be readily understood. The cross head is adapted to slide freely vertically and any suitable means may be employed for lubricating the guide rods and the openings of the cross head and while the latter are shown plain, any suitable form of anti-friction bearings may, of course, be employed, if desired. The cross head presents a flat upper face to the pistons 3 which are provided at their lower ends with horizontal attaching flanges 14 which are secured to the cross head by suitable bolts or screws 15. The pistons are secured to the cross head adjacent the end lugs 5 which project at the top and bottom of the cross head. The pistons 3 and the cylinders may, of course, be of any desired construction and as any preferred construction of piston and cylinders may be employed, detail description and illustration of the same are deemed unnecessary.

The slide which reciprocates horizontally is preferably composed of upper and lower sections and is provided with a central bearing 16 for the reception of a crank element 17 which is preferably in the form of a wrist pin mounted eccentrically on and carried by and connecting a pair of fly wheels 18. The fly wheels 18 are suitably secured to sections of the crank shaft 2 and they may be of any desired size and are located at opposite sides of the slide transmission but the form of the crank element for transmitting motion from the horizontal reciprocating slides to the crank shaft may be varied to adapt the structure for the particular use for which the motor is designed. The crank shaft will be journaled in suitable bearings at opposite sides of each slide transmission and the front end of the crank shaft will preferably be extended as shown and may be provided with a propeller but any other means may be employed for taking the power from the crank shaft. In practice a suitable bearing will be provided adjacent the extended front end of the crank shaft. The sections of the horizontal reciprocating slide may be bolted or otherwise secured together and they are confined between the sections of the cross head and if desired any suitable form of anti-friction bearing may be employed.

The downward movement of the pistons of the cylinders when a charge is exploded will move the cross head downwardly and reciprocate the slide horizontally and transmit rotary motion to the crank shaft. Any desired firing order may of course be employed but they will preferably occur at points equally spaced from the center of the crank shaft and at opposite sides thereof to produce a uniform distribution of the power and in large motors where four rows of cylinders are employed when a cylinder is fired at a cross head at one side of the crank shaft a cylinder may be simultaneously fired at the opposite side of the crank shaft and at an equal distance therefrom. This will equalize the application of power applied to the cross heads.

It will be seen that the slide transmission does away with all connecting rods usually employed for transmitting the motion and power of the piston to crank shafts and as each connecting rod requires two bearings one at either end of the rod it will be clear that not only does the present invention eliminate the connecting rods but readily reduces the number of bearings required in a motor.

Also in the case of motors employing a crank shaft for each row of cylinders and a power transmission shaft the present invention will reduce the number of crank shafts and enable the power of all the cylinders to be transmitted to a single crank shaft.

The vertical openings 6 of the cross head are preferably fitted with sleeves 19 which form continuous bearings and present continuous bearing surfaces to the guide rods 7.

What is claimed is:

1. The combination with a plurality of cylinders and pistons, of a slide transmission, comprising spaced guide rods rigid with and extending longitudinally from the cylinders, a cross head rigidly connecting the pistons and slidable on the guide rods and provided with spaced guides extending longitudinally of the cross head, a reciprocating slide mounted between the guides of the cross head and movable longitudinally thereof and having a bearing, a crank shaft composed of sections, fly wheels mounted on the sections and arranged at opposite sides of the cross head and slide, and an eccentric wrist pin connecting the fly wheels and mounted in the bearing of the slide.

2. The combination of a plurality of cylinders having pistons provided at their ends with attaching means, a cross head rigidly secured to the attaching means and coupling the pistons and carried by the latter, guide rods rigid with the cylinders and extending longitudinally from the same and guiding the cross head, a slide mounted on the cross head and carried by the same and movable longitudinally thereof, a crank shaft, fly wheels mounted on the crank shaft and located at opposite sides of the cross head, and an eccentric pin carried by the fly wheels and mounted in the bearing of the slide.

3. A slide transmission for internal combustion engines, comprising a cross head designed to be secured to a plurality of pistons for coupling the same, said cross head being composed of separate sections provided with end flanges abutting against each other and spacing the intermediate portions of the sections to form an opening, said sections being provided at the opening with longitudinal guide ribs, a slide arranged in the opening of the cross head and having grooves receiving the said ribs, said slide being divided longitudinally to form separate sections and provided with a bearing, a crank shaft, fly wheels mounted on the crank shaft and arranged at opposite sides of the cross head, and an eccentric pin carried by the fly wheels and mounted in the bearing of the slide.

4. A slide transmission for internal combustion engines, comprising a cross head designed to be secured to a plurality of pistons for coupling the same, said cross head being composed of separate sections provided with end flanges abutting against each other and spacing the intermediate portions of the sections to form an opening, said sections being provided at the opening with longitudinal guide ribs, a slide arranged in the opening of the cross head and having grooves receiving the said ribs, said slide being divided longitudinally to form separate sections and provided with a bearing, a crank shaft, fly wheels mounted on the crank shaft and arranged at opposite sides of the cross head, an eccentric pin carried by the fly wheels and mounted in the bearing of the slide, and spaced guide rods arranged in pairs and passing through the end flanges of the cross head for guiding the latter.

In testimony whereof I affix my signature.

THOMAS M. FINLEY.